United States Patent Office 3,471,101
Patented Oct. 7, 1969

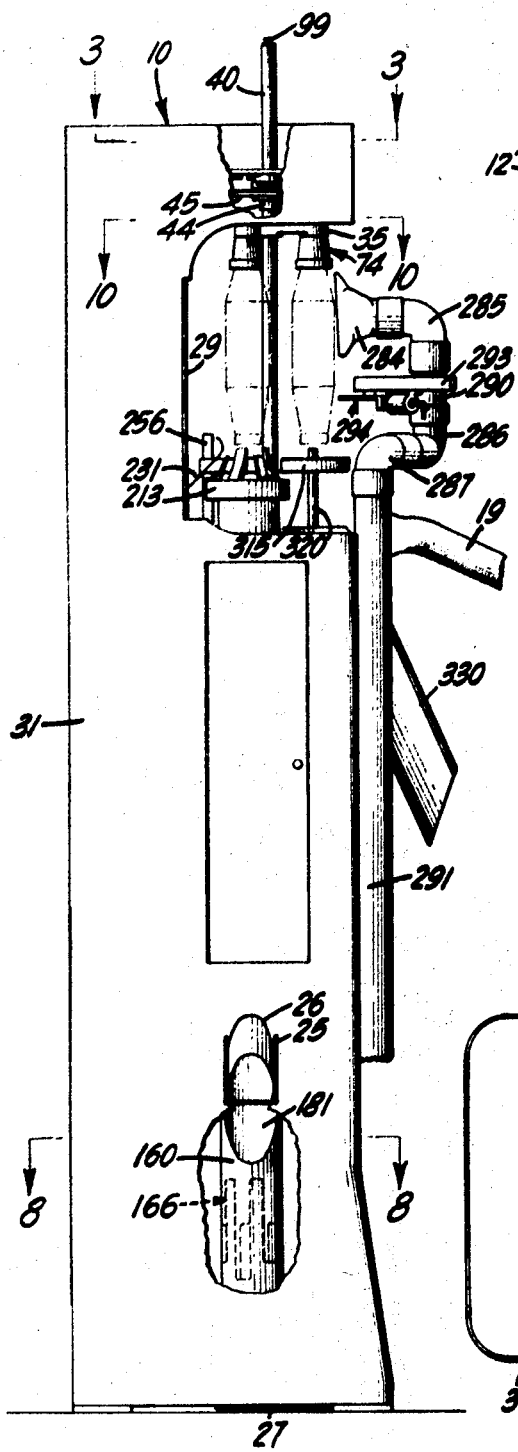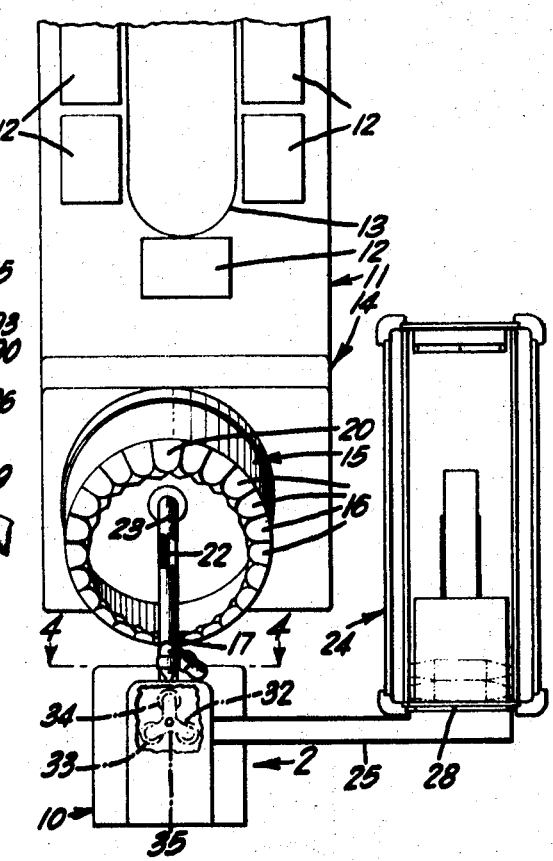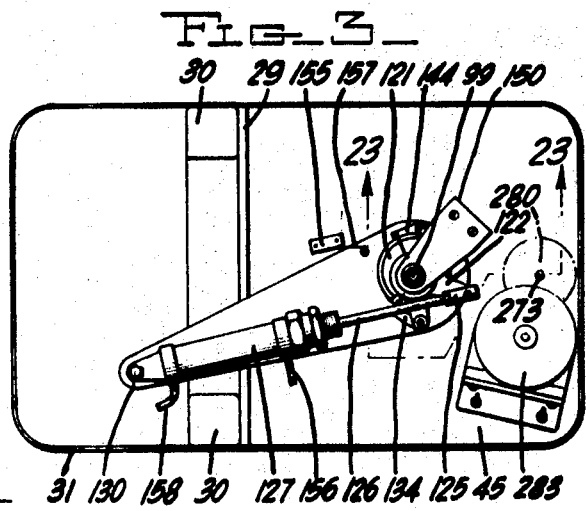

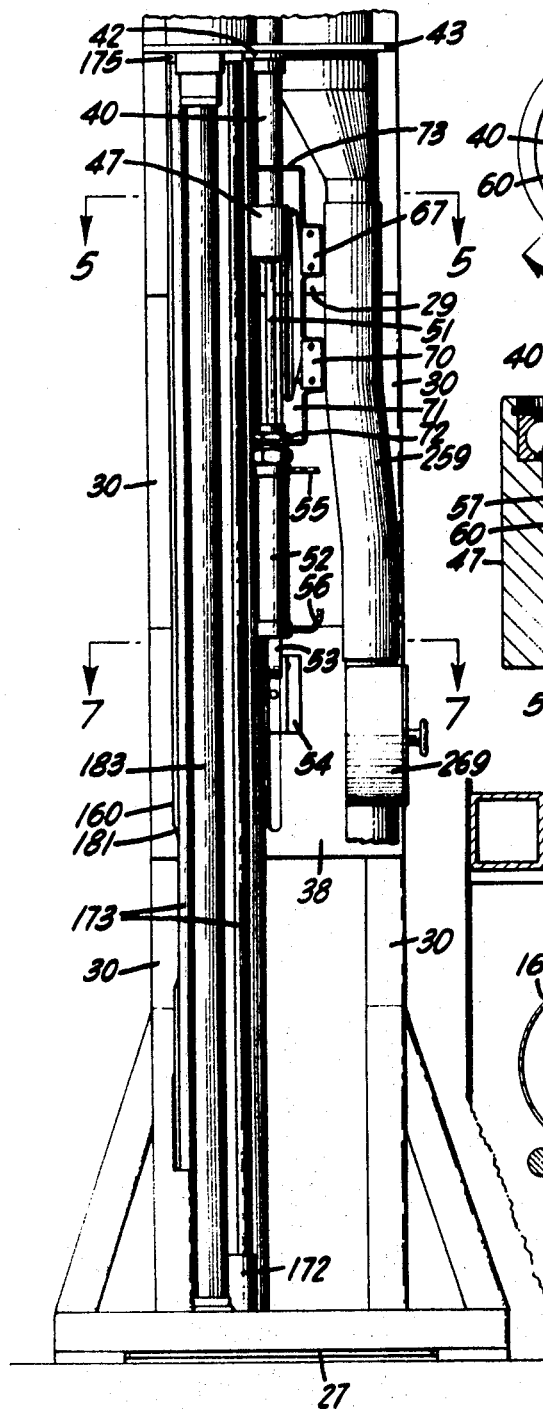
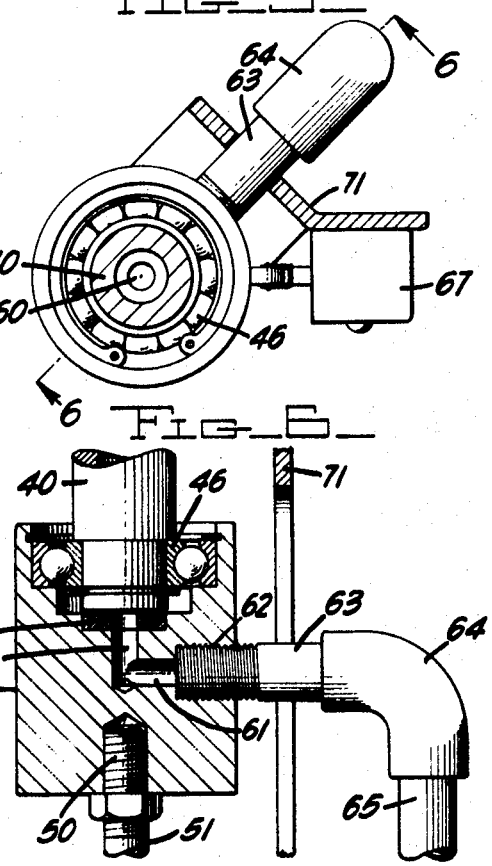
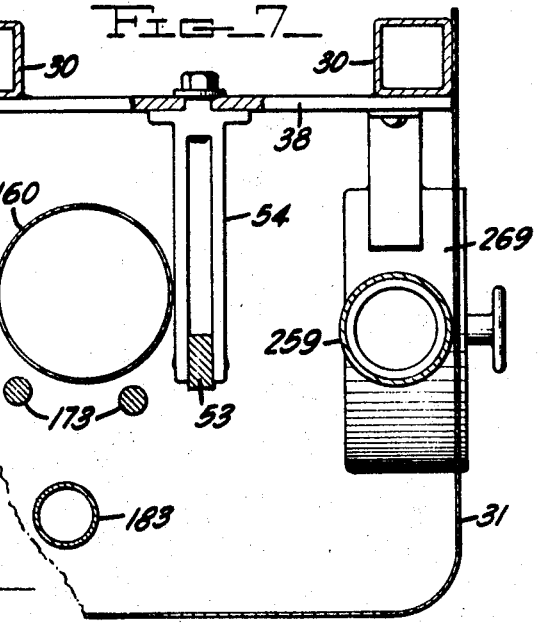

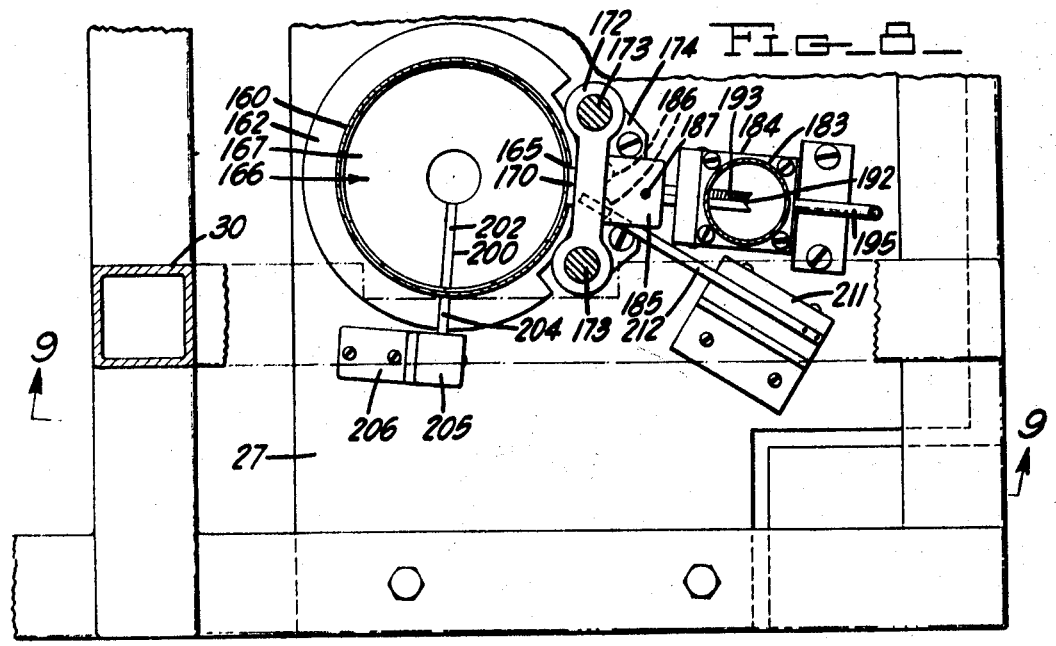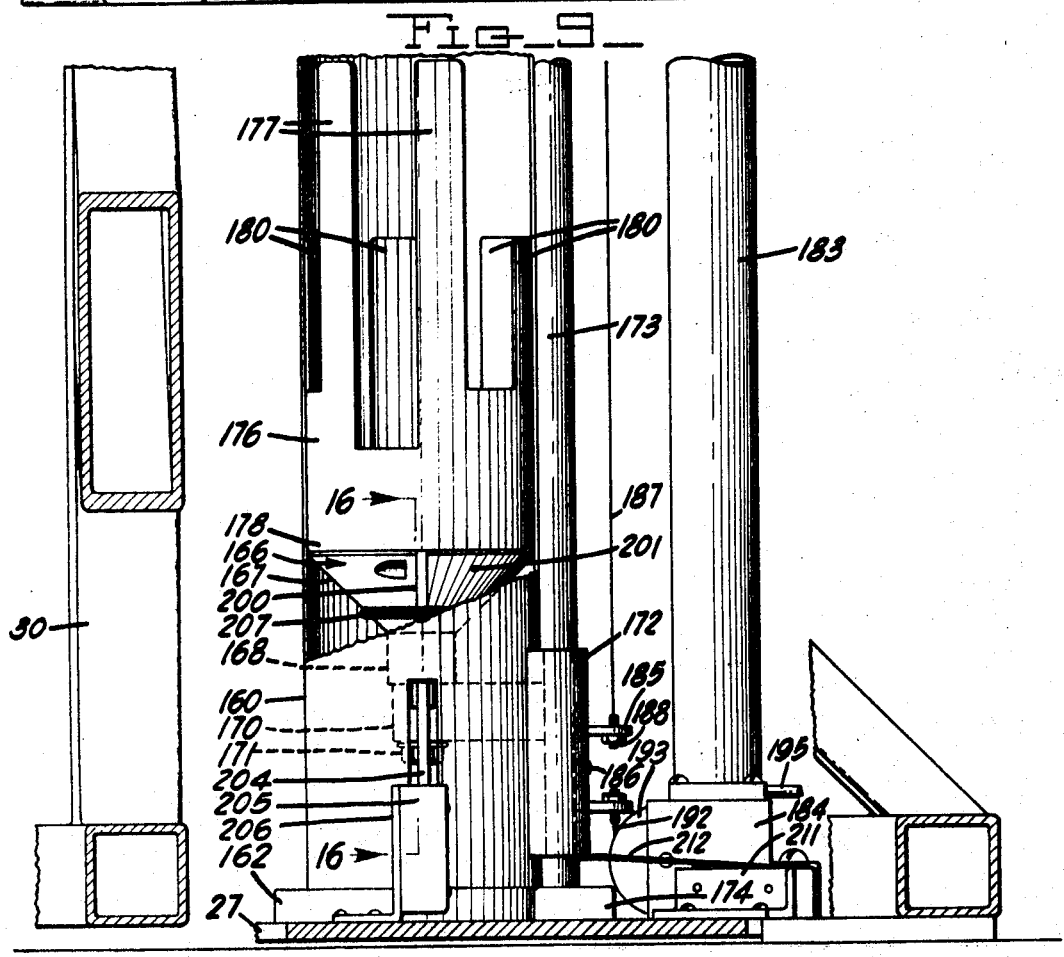

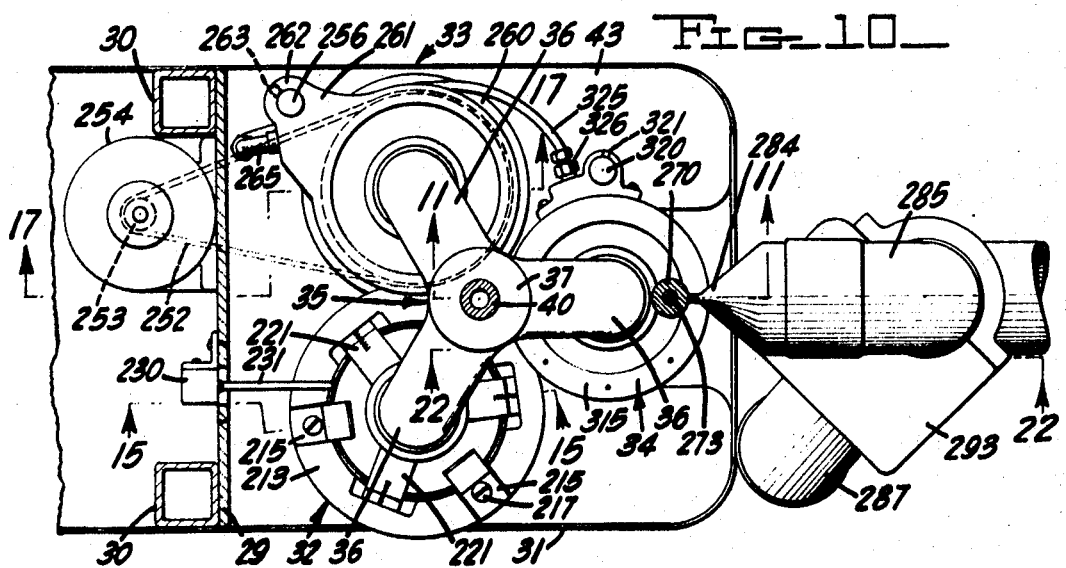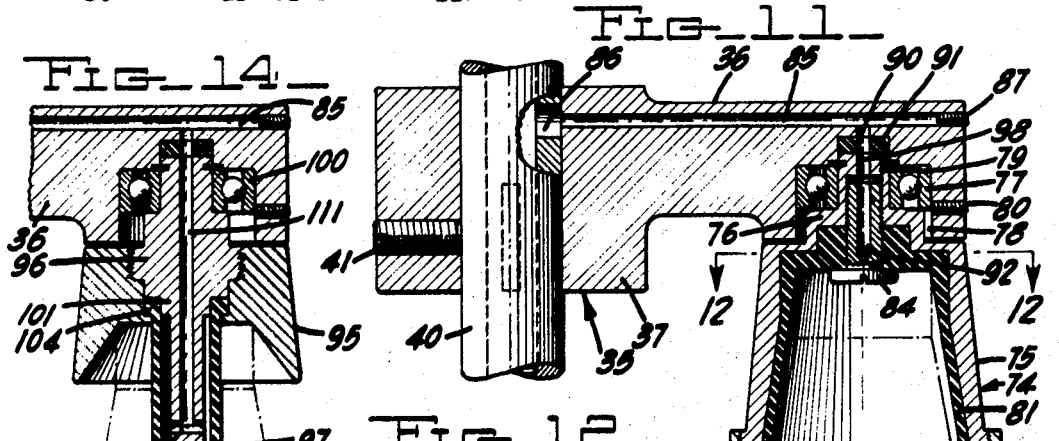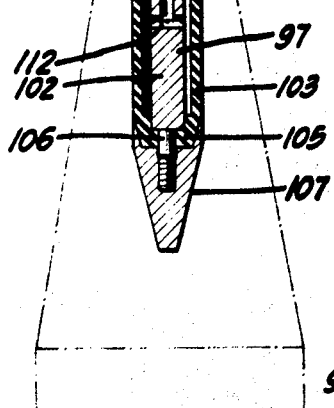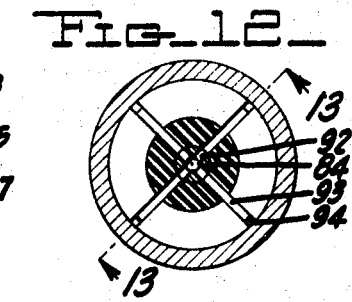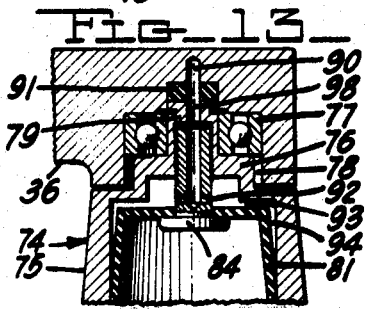

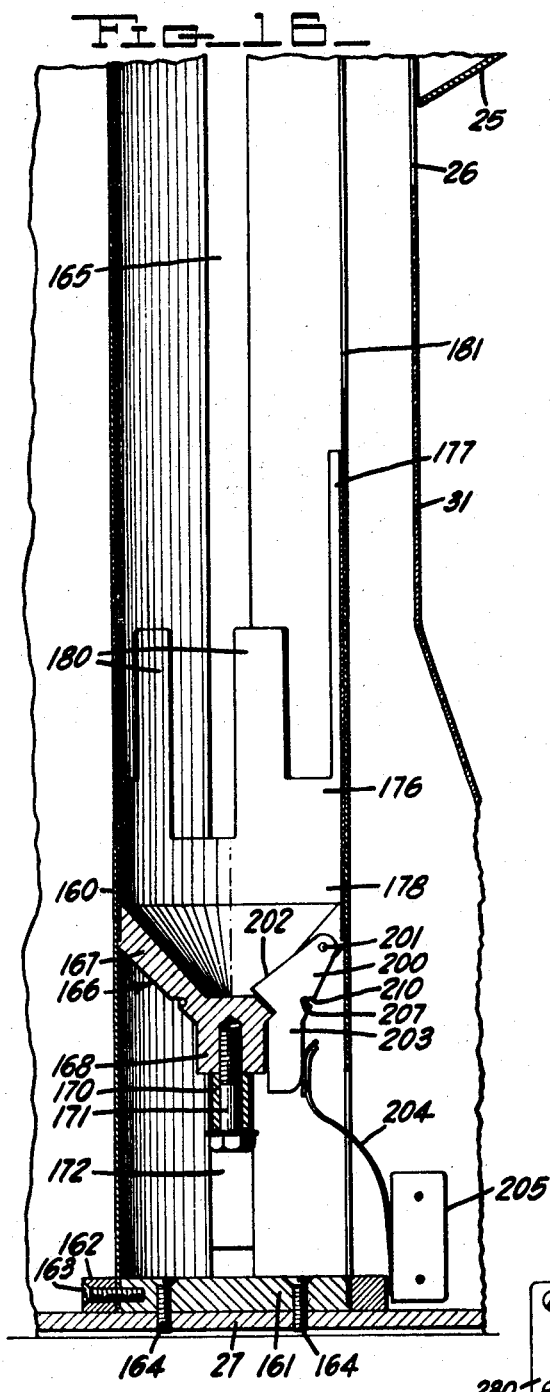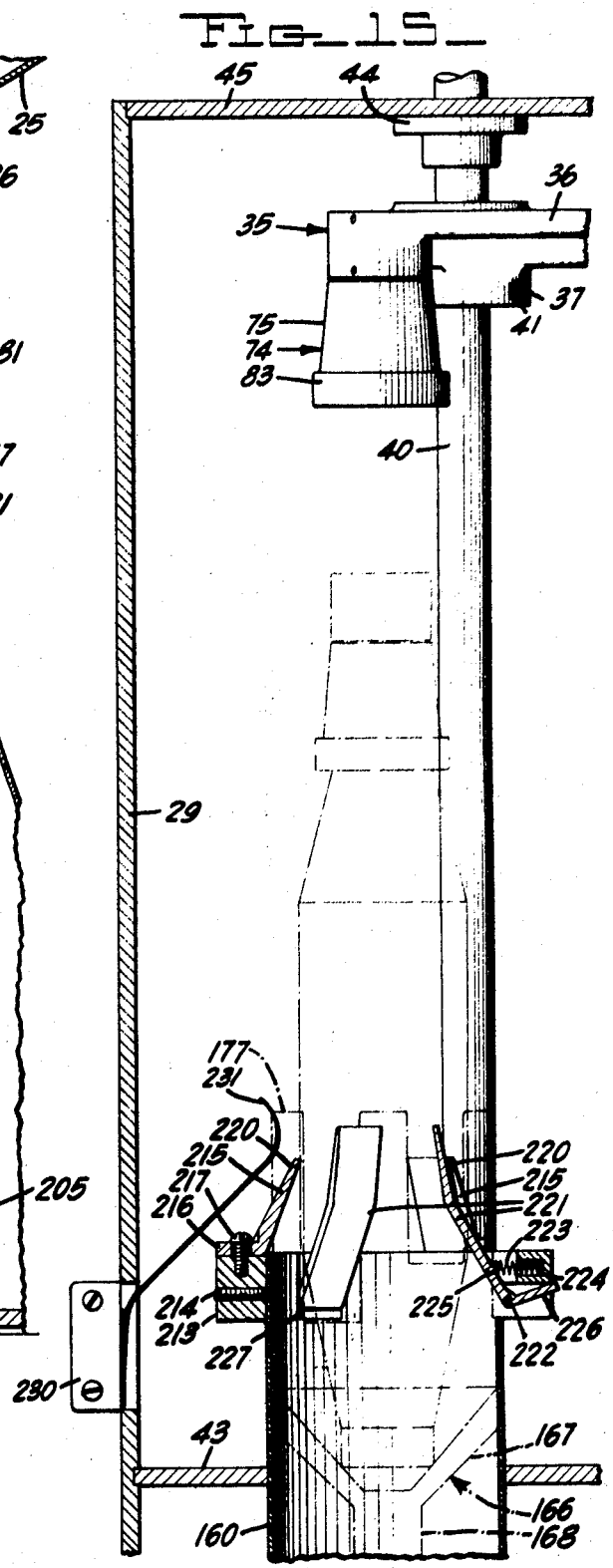

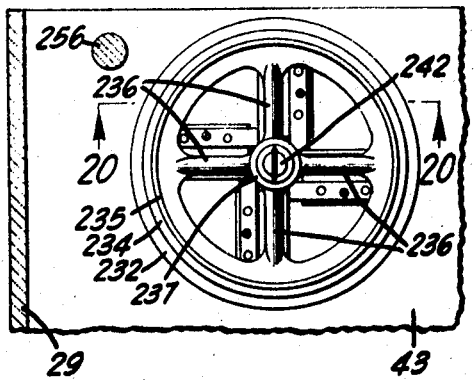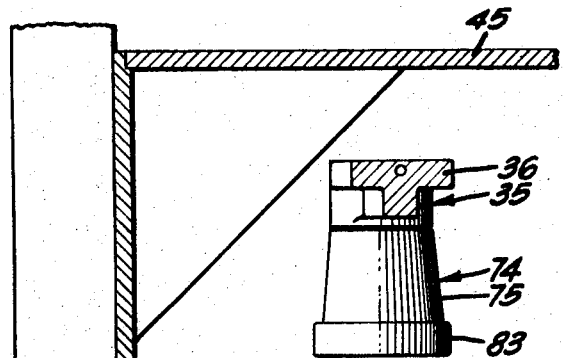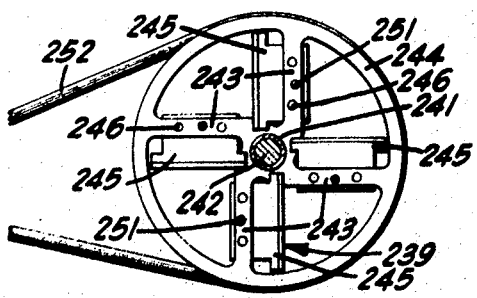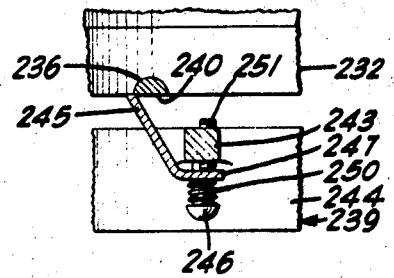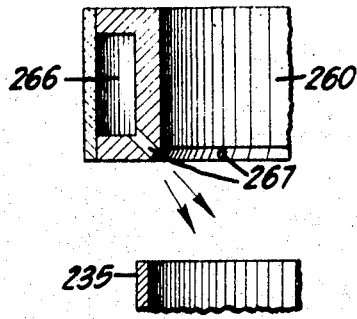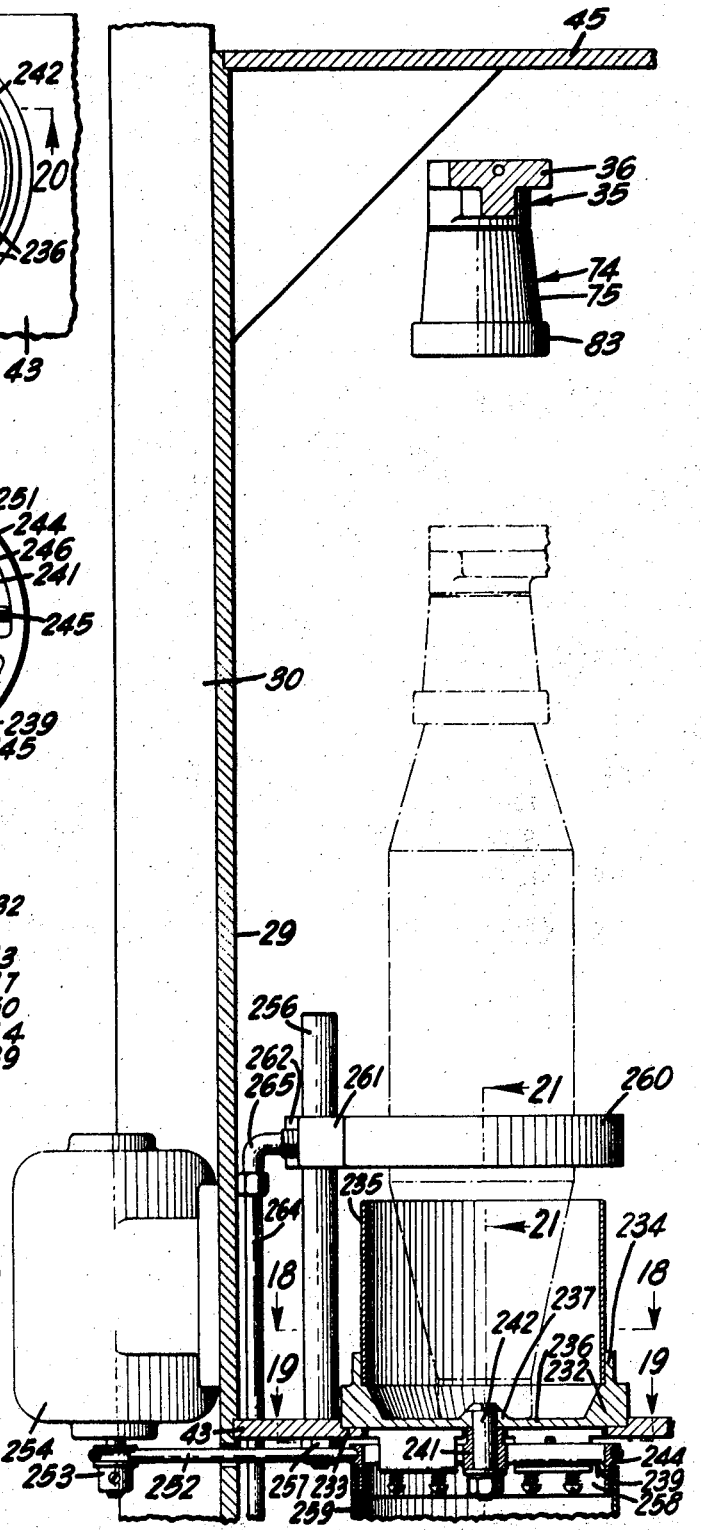

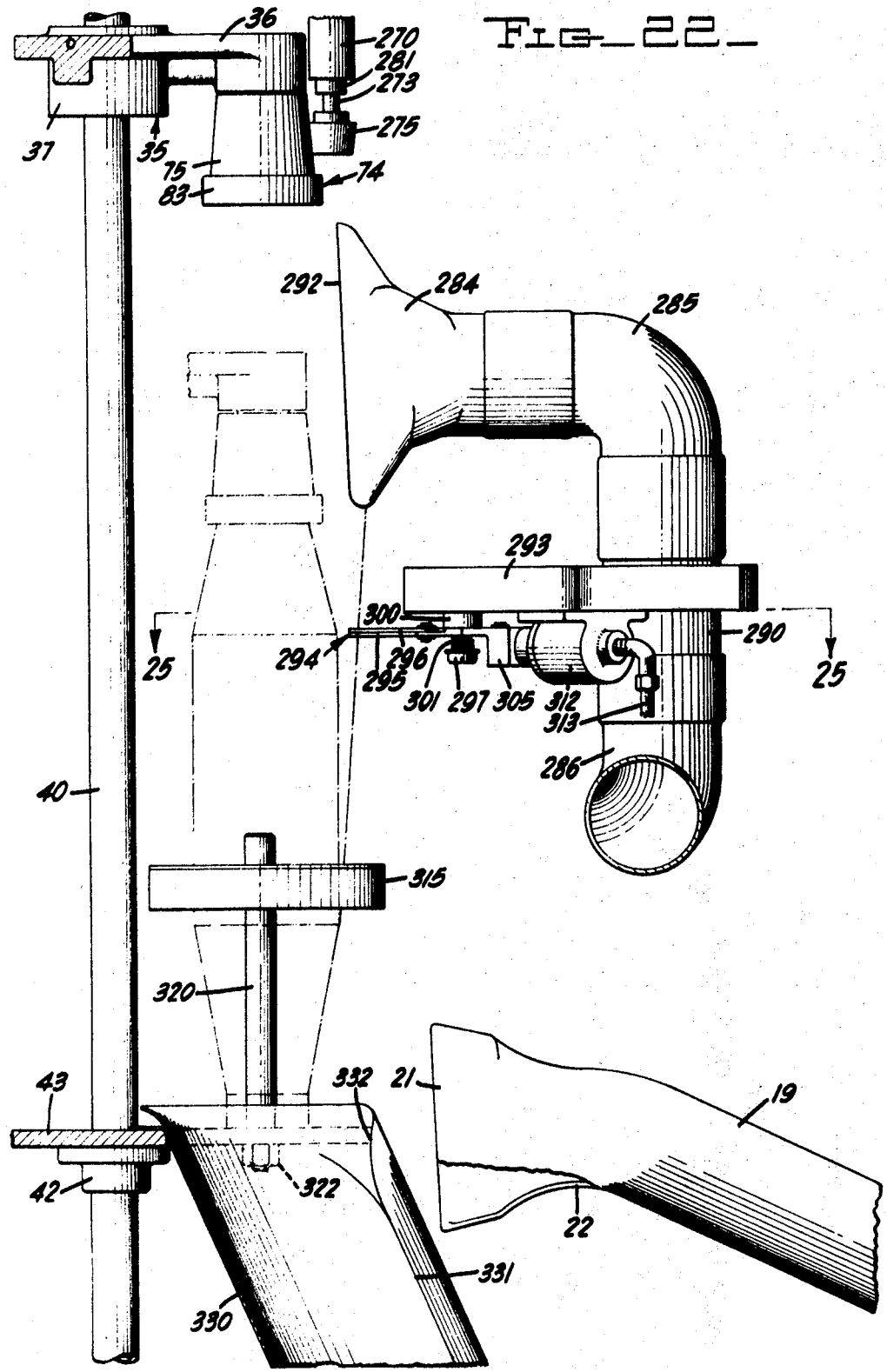

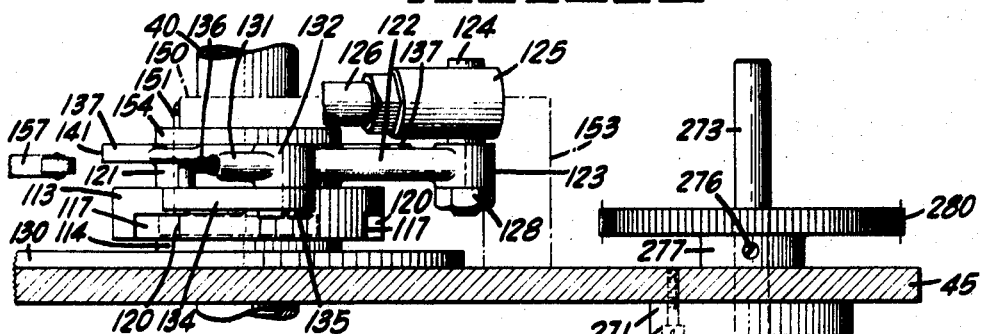
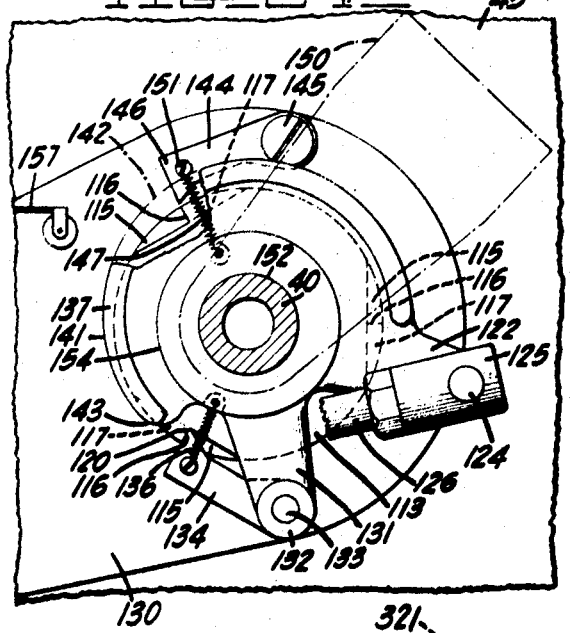
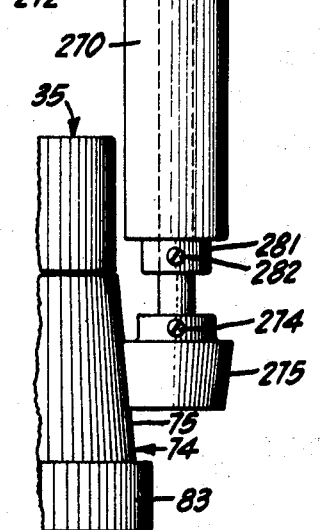
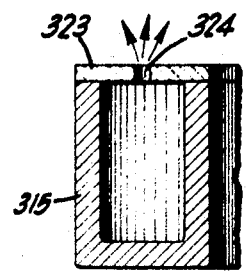
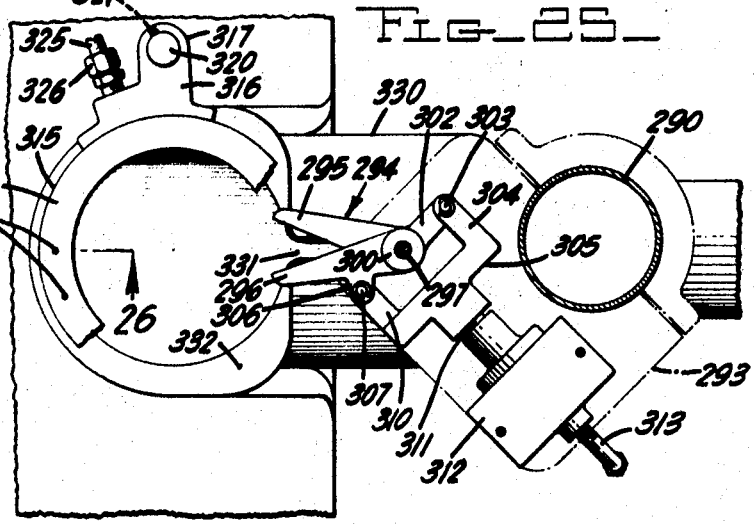

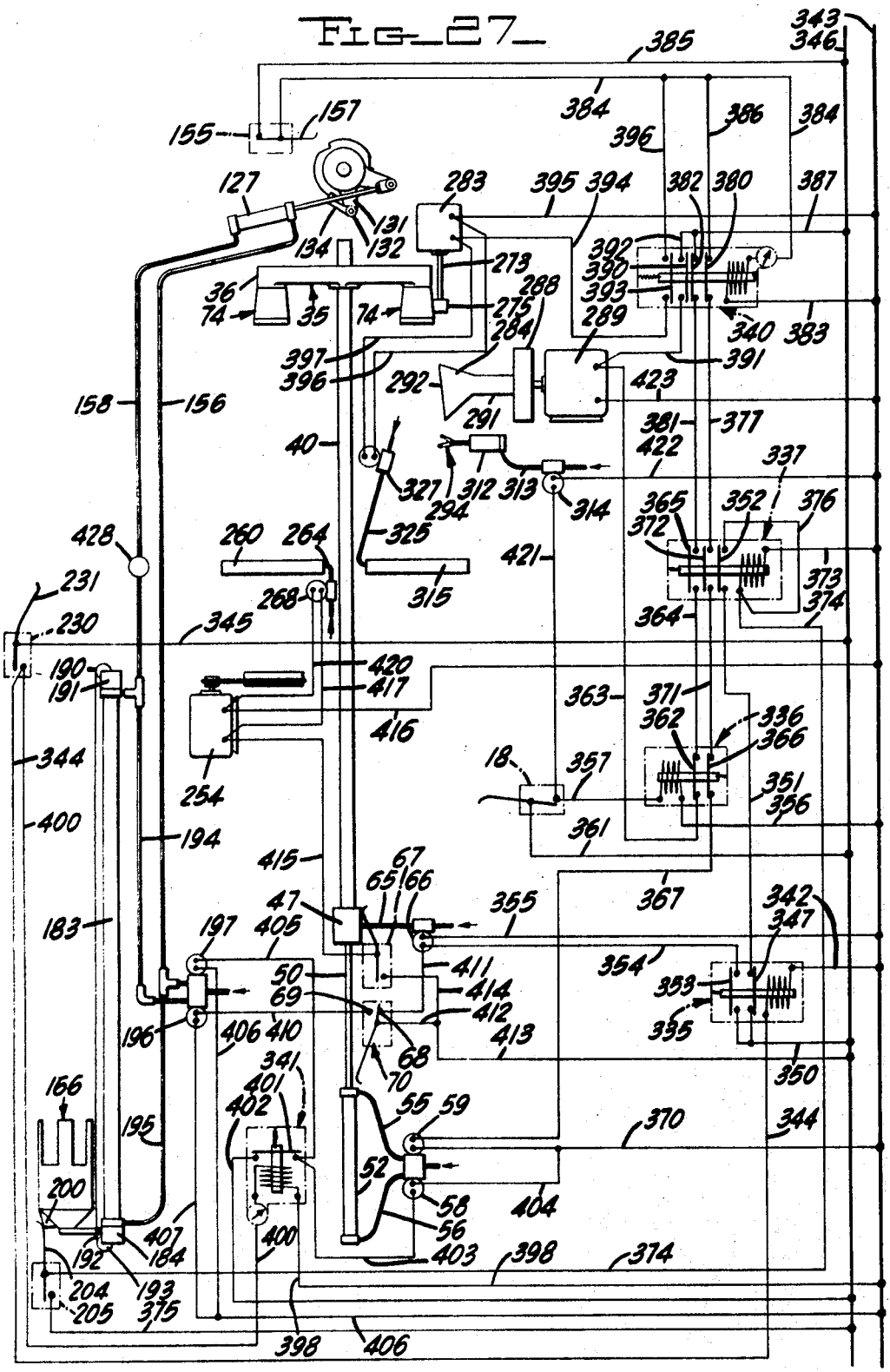

3,471,101
BOBBIN-READYING MEANS FOR AUTOMATIC WINDERS
James D. Moyer, Wyomissing, and Richard F. Spittler, Wernersville, Pa., assignors, by mesne assignments, to North American Rockwell Corporation, Pittsburgh, Pa., a corporation of Delaware
Filed May 5, 1967, Ser. No. 636,400
Int. Cl. B65h 69/04
U.S. Cl. 242—35.6         9 Claims

ABSTRACT OF THE DISCLOSURE

The disclosure concerns an apparatus for readying yarn bobbins and loading them into the bobbin magazine or other yarn supply holder of an automatic winder. The apparatus includes a readying device comprising a turret having three arms each carrying means adapted to releasably grip a bobbin by the upper end of its stem the turret being indexable to successively position the bobbin gripping means of each arm at each of three stations. In addition to its rotary or indexing movement the turret is adapted for vertical movement between an elevated and lowered position the indexing taking place in the elevated position of the turret. At a first or bobbin receiving station a bobbin, supplied as by gravity from a hopper, is elevated into a position to be grasped by the gripping means carried by the overlying arm of the turret when the latter is moved to its low position. The turret is then raised to its elevated position carrying the bobbin with it for indexing. At the second station a bobbin, with the turret in its low position, is subjected to an annular inwardly and downwardly directed blast of air to dislodge terminal lengths of yarn such as reserve or tailing windings which are conventionally found at the lower end of the bobbin stem. The annular blast of air serves to draw out the reserve or tailing windings in a direction substantially axially out of the bobbin. A cutter is located beneath the bobbin which severs such extending yarn portions and provides a free end leading from the yarn body of the bobbin. Upon elevation of the turret to its upper position the bobbin thus serviced is carried upwardly with its overlying arm. At the third station and before the turret is lowered a bobbin at that position is rotated and subjected to an air current set up in a suction nozzle positioned adjacent the yarn body whereby the free yarn end is found and held. The movements of the turret to its low position is initiated by a signal from the winder that a replacement bobbin is required such signal initiating the entire cycle of operation. Upon the lowering of the turret the bobbin at the third station is released to pass by gravity down a chute to the magazine of the winder, a length of the yarn from the bobbin during its passage being caught in an air stream set up in a conduit leading to the yarn end holding means of the winder. Upon deposit of the bobbin in the magazine a cutter is operated to sever the yarn adjacent the suction nozzle the yarn end leading from the point of severance to the bobbin being carried in the airstream to the yarn end holding means of the winder for retention therein.

Background of the invention

The invention relates to bobbin readying means for automatic winders as employed in the textile industry to unwind yarn from the bobbins on which the yarn is collected in the spinning operation and rewind it into larger packages or cones as required for further operations in the conversion of the yarn into textile fabrics or other end products. Bobbins as they are received from the spinning machine characteristically have the last wound portions of the main yarn body adjacent the upper tip of the bobbin the yarn leading therefrom in an open spiral to the base of the bobbin below the yarn body where it is wound in a few turns, usually referred to as tailing windings, the yarn terminating in a tail end. A starting end of the yarn also normally protrudes from beneath the yarn body adjacent the base of the bobbin and in many cases it is found that starting and tail ends have become entangled.

Automatic winders, of the type with which the present invention is concerned, have servicing means which among other things, automatically replace a bobbin from which the yarn has been exhausted with a full or supply bobbin, find the yarn end on the full bobbin and the yarn end on the package, and knot the two ends together. In order for the servicing means to perform these functions successfully there must be a free yarn end leading from the yarn body on the bobbin and the tailing windings must be removed to prevent interference or entanglement during the unwinding operation. Hence it is necessary to prepare or ready the bobbins before their delivery to their unwinding positions on the winder.

Conventionally the readying operation has been performed by hand and the readied bobbin manually positioned in the servicing unit of the winder. For example in the operation of a known type of automatic winder which has a stationary servicing unit including a magazine for the supply bobbins and a suction nozzle for holding the yarn ends leading from the severed bobbins, the manual operations heretofore required have included the disentangling of tailing windings and their removal from each supply bobbin, the placing of the supply bobbin in the magazine, and the withdrawing of a length of yarn from the bobbin and the positioning of the yarn end in the suction nozzle. Inasmuch as such manual operations consume an undue proportion of the operator's time it is highly desirable that they be eliminated and that the initial readying steps as well as the transfer of the bobbin with its found end to the magazine be performed automatically. While numerous attempts have been made heretofore to carry out such steps by mechanical means such attempts have not achieved the necessary reliability to insure a continued supply of readied bobbins properly positioned in the magazine and with their yarn ends available for the winder servicing operation.

Summary of the invention

The invention has for its principal object the provision of an improved bobbin readying unit which will automatically perform the several necessary preparatory steps, heretofore mentioned, and will deliver the readied bobbins with the yarn end found to a magazine or other bobbin holding means of a winder, such delivery taking place upon a signal from the winder that a replenishment bobbin is needed.

The foregoing, and other objects of the invention which will become apparent hereafter, are attained by a self-contained bobbin readying unit having a first or bobbin receiving station to which the bobbins, normally with tailing windings and otherwise in their condition as when doffed from the spinning frame, are delivered by any suitable means such as by gravity. The unit comprises a second station at which each bobbin is subjected to an annular blast of air delivered from a location intermediate the ends of the bobbin and directed toward the bobbin end or base carrying the tailing windings. The annular blast of air serves to strip the tailing windings from the bobbin and draw out the yarn thereof in a direction substantially axially of the bobbin. The second station also includes means located below but adjacent the bobbin base to sever the drawn out yarn to leave a free end leading from the body of yarn on the bobbin. The unit further comprises a third station having means to find and hold the freed yarn end. In addition the unit includes means for grasping each bobbin received at the first station, positioning it successively at the second and third stations and, following the finding of the yarn end at the third station, releasing it for transfer to the magazine or other bobbin holding means of the winder with the found yarn end held by the end holding means of the winder.

The invention further resides in means and mechanisms employed at each of the stations for performing the required functions thereat, the mechanism for grasping and positioning the bobbins at the several stations and the control means whereby the several functions are performed at the required times, all such means and mechanisms being described in detail hereinafter.

Brief description of the drawings

FIG. 1 is a plan view disclosing the bobbin readying unit of the instant invention in association with a typical automatic winder and bobbin supply hopper;

FIG. 2 is a side elevational view on an enlarged scale, looking in the direction of the arrow 2 of FIG. 1, of the bobbin readying unit;

FIG. 3 is a cross-sectional view on an enlarged scale taken on the line 3—3 of FIG. 2 looking in the direction indicated by the arrows;

FIG. 4 is a front view, looking in the direction of the arrows 4—4 of FIG. 1, of the lower portion of the bobbin readying unit with a cover plate removed;

FIG. 5 is a cross-sectional view on an enlarged scale taken on the line 5—5 of FIG. 4, looking in the direction indicated by the arrows;

FIG. 6 is a cross-sectional view taken on the line 6—6 of FIG. 5 looking in the direction indicated by the arrows;

FIG. 7 is a cross-sectional view on an enlarged scale taken on the line 7—7 of FIG. 4 looking in the direction indicated by the arrows;

FIG. 8 is a cross-sectional view on an enlarged scale taken on the line 8—8 of FIG. 2 looking in the direction indicated by the arrows;

FIG. 9 is a cross-sectional view taken on the line 9—9 of FIG. 8 looking in the direction indicated by the arrows;

FIG. 10 is a cross-sectional view on an enlarged scale taken on the line 10—10 of FIG. 2 looking in the direction indicated by the arrows;

FIG. 11 is a cross-sectional view on an enlarged scale taken on the line 11—11 of FIG. 10 looking in the direction indicated by the arrows;

FIG. 12 is a cross-sectional view taken on the line 12—12 of FIG. 11 looking in the direction indicated by the arrows;

FIG. 13 is a cross-sectional view taken on the line 13—13 of FIG. 12 looking in the direction indicated by the arrows;

FIG. 14 is a cross-sectional view similar to the view of FIG. 11 but illustrating a modification;

FIG. 15 is a cross-sectional view on an enlarged scale taken on the line 15—15 of FIG. 10 looking in the direction indicated by the arrows;

FIG. 16 is a cross-sectional view taken on the line 16—16 of FIG. 9 looking in the direction indicated by the arrows;

FIG. 17 is a cross-sectional view on an enlarged scale taken on the line 17—17 of FIG. 10 looking in the direction indicated by the arrows;

FIG. 18 is a cross-sectional view taken on the line 18—18 of FIG. 17 looking in the direction indicated by the arrows;

FIG. 19 is a cross-sectional view taken on the line 19—19 of FIG. 17 looking in the direction indicated by the arrows;

FIG. 20 is a cross-sectional view on an enlarged scale taken on the line 20—20 of FIG. 18 looking in the direction indicated by the arrows;

FIG. 21 is a cross-sectional view on an enlarged scale taken on the line 21—21 of FIG. 17 looking in the direction indicated by the arrows;

FIG. 22 is a cross-sectional view on an enlarged scale taken on the line 22—22 of FIG. 10 looking in the direction indicated by the arrows;

FIG. 23 is a cross-sectional view on an enlarged scale taken on the line 23—23 of FIG. 3 looking in the direction indicated by the arrows;

FIG. 24 is a top plan view with parts in section of a portion of the apparatus illustrated in FIG. 23;

FIG. 25 is a cross-sectional view taken on the line 25—25 of FIG. 22 looking in the direction indicated by the arrows;

FIG. 26 is a cross-sectional view on an enlarged scale taken on the line 26—26 of FIG. 25 looking in the direction indicated by the arrows; and FIG. 27 is a wiring diagram illustrating the control means of the bobbin readying unit.

Description of the preferred embodiment

Referring now to the drawings and first particularly to FIG. 1 the yarn readying unit of the instant invention is indicated at 10 in association with a winder indicated at 11. Winder 11, which is not shown in detail, may be of any suitable or known type but as the readying unit of the invention has found a particular field of use in connection with an automatic winder of the traveling winder unit and stationary servicing station type, such winder is diagrammatically illustrated. Thus the winder includes a plurality of winder units 12 supported by suitable conveying means 13 by which the units are periodically brought to a servicing station indicated generally at 14 for bobbin replenishment when a supply bobbin is exhausted, for knotting the ends of the new supply bobbin to the yarn of the package being wound and such other servicing operations as are conventionally to be performed. The servicing station includes a rotatable magazine 15 comprising an annular series of bobbin containers 16 overlying a fixed plate on which the bases of the bobbins rest, each container being adapted to convey a bobbin from the magazine loading position, indicated at 17, to the position 20 at which the bobbin is delivered, through an opening in the fixed plate, to the bobbin holder of the winder unit on a request for a replenishment bobbin. A normally open limit switch 18 (see FIG. 27), included in the control system hereinafter described, is positioned on the fixed plate at the loading position 17 to be closed by a bobbin inserted in a container 16 at that position. The servicing station also includes means for holding the found yarn ends of each of the bobbins carried in the containers of the magazine such holding means conventionally comprising an open mouthed suction tube located centrally of the magazine. For the purposes of associating the winder with the readying unit of the invention the suction tube 19 is extended and terminates in a mouth 21 adjacent the readying unit as illustrated in FIGS. 1 and 22. Also the tube 19 has been provided with a longitudinally extending slot 22 leading from its mouth 21 to one end of a semicircular transverse slot 23 the ends of the slot 23 being approximately opposite positions 17 and 20 respectively (FIG. 1). The function of the extended slotted tube 19 will become apparent hereafter.

Also associated with the bobbin readying unit is a hopper 24 of any suitable type adapted to contain a plurality of full bobbins in the condition that they are received from the spinning frame, the bobbins lying laterally of the hopper with their lower ends or bases toward the left as viewed in FIG. 1. The hopper is provided with a gate 28 of suitable type which may be opened by means not shown, but preferably automatically on a signal from the readying unit to permit a bobbin to roll or drop into a chute 25 inclined downwardly toward the readying unit and terminating at a bobbin receiving mouth 26 of the latter (see FIG. 2) whereby the bobbins, as required, are delivered by gravity to the bobbin readying unit.

Referring particularly to FIGS. 2 to 7, the bobbin readying unit 10 is structurally independent of the winder and comprises an upright box-like structure having a base 27, a pair of vertically extending frame members 30 supporting a vertically extending plate 29, cover members 31 and suitable other frame members not shown in detail. Adjacent the upper end of the unit portions of the side cover plates are cut away and the front cover plate is omitted (see FIG. 2) to define an open space accommodating certain of the operating mechanisms. These are located at three stations, namely a first or bobbin receiving station indicated generally at 32, a second or yarn end freeing station indicated generally at 33 and a third or end finding and bobbin delivery station indicated generally at 34 (see FIG. 10). The construction and operation of the mechanisms at each of these stations will hereinafter be described.

The readying unit also includes a mechanism for grasping a bobbin received at said first station and conveying it through the second and third stations. Referring particularly to FIGS. 2 to 12, 23 and 24 the bobbin conveying means comprises a turret 35 having three equally spaced arms 36 preferably integrally connected to a hub 37 (see FIGS. 10 and 11). Hub 37 is mounted in fixed position on a hollow rod 40 as by set screw 41. Hollow rod 40 is supported for sliding and rotating movements in a bushing 42 carried by a lower shelf plate 43 (FIG. 4) and a bushing 44 carried by an upper shelf plate 45 (FIGS. 2 and 15) shelf plates 43 and 45 defining respectively the floor and ceiling of the open space previously mentioned. The lower end (see FIGS. 4 to 6) of rod 40 is of reduced diameter and is carried in a bearing 46 such as the ball bearing illustrated. The outer race of the ball bearing is mounted in a block 47 carried by an extending end 50 of a piston rod 51 of an air cylinder 52. The air cylinder, at its lower end has a boss 53 secured to a bifurcated bracket 54 which in turn is secured to vertically extending plate 38. Air under pressure is supplied through lines 55 and 56 to the air cylinder at opposite sides of the piston (not shown) of rod 51, under the control of solenoid operated valves 58 and 59 (see FIG. 27), to move the turret between a raised position, as shown for example in full lines in FIGS. 2 and 22, and a lowered position as illustrated in dot-and-dash lines in the latter figure. As illustrated particularly in FIG. 6 the lower end of rod 40 rests on a thrust washer 57. An axial bore 60 in block 47 is in communication with the interior of the hollow rod 40 through washer 57 and connects with a radial bore 61 terminating in a threaded opening 62. A nipple 63 is threaded into opening 62 and into an elbow 64 which is connected to a flexible air line, such as a hose 65, which in turn is in communication through a solenoid valve 66 (shown only in FIG. 27) with a suitable source of compressed air. Upper and lower limit switches 67 and 70 respectively for a purpose hereinafter set forth are carried by a bracket 71 having an apertured lower flange secured by a nut 72 against the upper end of cylinder 52 and an apertured upper flange 73 through the aperture of which the rod 40 extends (FIG. 4). The limit switches are of a type and the actuating blades thereof are so located that the upper switch 67, which is normally open, is closed by block 47 when the rod and its associated turret are in their elevated positions and the lower switch 70, which is normally closed against contact 68, is closed against contact 69 when the rod and turret are in their lowered positions (see FIG. 27).

Referring particularly to FIGS. 10 to 14 each turret arm 36 at its outer end supports a bobbin grasping and holding device indicated generally at 74 and which may be of alternative constructions. In the form illustrated in FIGS. 11 and 12 the bobbin holder comprises a shell 75 having an upwardly projecting stepped end 76 mounted for rotation in a ball bearing 77 which in turn is mounted in a downwardly opening recess 78 of arm 36. The outer race of bearing 77 is secured in position against the bottom of the recess as by one or more set screws 80. A cup 81 of any suitable flexible expandable material such as natural or synthetic rubber is mounted within and serves as a loose liner for shell 75. The cup is secured within the shell by a flanged ring 83 threaded onto the shell rim and by a hollow stud 84 penetrating the upper end of the cup and threaded into a recess in an upwardly projecting portion 79 of the shell. Arm 36 has an air passageway 85 extending the length thereof and leading from an opening 86 in communication with the interior of hollow rod 40, the outer end of the passageway being closed as by plug 87. A branch passageway 90 leads from passageway 85 and is in communication, through a washer 91 and a bore 98 of portion 79, with the hollow interior of stud 84. Referring particularly to FIGS. 12 and 13 stud 84 has equally spaced radial passageways 92 communicating with horizontal and vertical slots 93 and 94, respectively, formed in the outer wall of the cup. As will be understood air under pressure supplied to the hollow interior of rod 40, the rod being closed at its upper end as by plug 99 (FIG. 2), will flow through the several passageways and finally between the walls of the shell and the cup to cause the wall of the cup to distort or inflate and move into grasping relationship to the upper end of a bobbin inserted therein.

In the alternative embodiment illustrated in FIG. 14 a socket 95 is threadably secured to a hub 96 of a downwardly extending pin 97. The upper end of the pin includes a portion of reduced diameter secured for rotation in ball bearing 100 received and secured in a recess in the arm 36 similarly as the case of the ball bearing 77 in the embodiment of FIG. 11. Pin 97 includes a secondary hub portion 101 and a stem portion 102 of further reduced diameter extending downwardly from portion 101. A tubular element 103 of flexible expandable material such as natural or synthetic rubber includes an upper rim portion 104 fitting on hub portion 101 and a lower end wall 105. A downwardly projecting stud 106 of pin 97 extends through an opening in end wall 105 and is threaded into a substantially conical member 107, the latter serving to secure element 103 in its position on pin 97. The air passageway 85 leading from the hollow interior of rod 40 is in communication with a vertically extending passageway 111 in pin 97 the passageway terminating at a point substantially midway of the length of element 103 where it is in communication with branch passageways 112 leading to an annular space between element 103 and the pin. In use the pin 97 and its associated element 103 is inserted within the axial bore of the bobbin and when air under pressure is supplied to the space between the pin and element 103 through the several passageways the element inflates to grip and hold the bobbin.

Referring now particularly to FIGS. 3, 10, 23 and 24 the mechanism for indexing the turret to position each arm 36 to successively overlie each of the three stations 32, 33 and 34, previously mentioned, will be described. The mechanism for this purpose is supported on a plate 130 secured on upper shelf plate 45 and includes a circular block 113 having an opening through which rod 40 extends. Block 113 is keyed to rod 40 for rotation therewith the keyway (not shown) in the rod being extended to permit the required vertical movement of the shaft relatively to the block 113 during the raising and lowering of the turret 35. A spacer washer 114 is inserted between block 113 and plate 130. Block 113 is provided with three notches 115 in an upper half thereof the notches defining pawl abutment surfaces 116 each spaced 120 degrees from the other. Block 113 also has similar but oppositely directed notches 117 in the lower half thereof the notches 117 defining holding pawl abutment surfaces 120 in substantial vertical alignment with the abutment surfaces 116.

A second block 121 is mounted for oscillating movement on rod 40 above block 113. Block 121 carries an outwardly projecting arm 122 having a hub portion 123 receiving a pin 124 projecting upwardly through a fitting 125 secured to the end of a piston rod 126 of an air cylinder 127 mounted for pivotal movement on plate 130, the pin 124 and hub portion 123 being held in assembled relationship by a nut 128 threaded on the pin. Block 121 also includes an arm 131 having an outer end 132 receiving a pin 133. A pawl 134 is mounted for rocking movement on pin 133 between a head 135 thereof and end 132. The pawl is positioned to lie opposite the upper half of block 113 with its free end adapted to contact abutment surfaces 116 and is biased toward block 113 by a spring 136.

Block 121 has a flange portion 137 defining a cam ring 141 which extends approximately 240 degrees around block 121 its outer or camming surface gradually receding toward the plane of the outer surface of block 113 from approximately a high point designated by reference numeral 142 to a terminal point 143 of the cam. A pawl 144 is mounted for rocking movement on a pin 145 extending upwardly from plate 130 the pawl being supported at an elevation to position its free end 146 opposite the lower half of block 113. The pawl is directed to contact abutment surfaces 120 and pin 145 is so located that upon contact of the pawl with one of the abutment surfaces the bobbin holding member 74 of each arm will accurately overlie one of the stations 32, 33 or 34. The pawl 144 is biased toward block 113 by a spring 147 connected at one end to overlying arm 150 and at its other end to a pin 151 projecting upwardly from the pawl. Pin 151 is of a length to contact the camming surface of cam ring 141. The overlying end of arm 150 is bored as at 152 to receive rod 40 and a washer 154 is positioned on the rod between the arm and block 121. The opposite end of arm 150 is secured to a block 153 projecting upwardly from and secured to plate 45.

A normally closed limit switch 155 forming a part of the electrical system, which will be described later, is mounted on shelf plate 45. The actuating arm 157 of switch 155 is positioned to be contacted to open the switch by the hub portion 132 of arm 131 when this pawl is fully advanced in the turret indexing movement.

As will be understood from the above upon the admission of air under pressure as through a line 156 (see FIG. 27) to the piston of air cylinder 127 block 113 is rotated in a clockwise direction as viewed in FIG. 24. During such rotation pawl 134 is moved against one of the abutment surfaces 116, if not presently in substantial contact therewith, and upon its further rotation block 113 and hence rod 40 are rotated therewith. During such rotation pin 151 of holding pawl 144 rides on cam ring 141 the pawl gradually approaching the surface of block 113 until toward the completion of the stroke of the piston, pin 151 rides off the terminal point 143 of the cam and permits the pawl to enter a notch 117 and finally to contact the abutment surface 120 thus preventing further rotation of the block and hence of rod 40. The parts remain in such positions until the air pressure in line 156 is cut off and air pressure is applied to the opposite side of the piston of air cylinder 127 as through line 158 (see FIG. 27) whereby they are returned to the positions shown in FIGS. 23 and 24.

Referring now particularly to FIGS. 2, 8, 9, 15 and 16 the construction and operation of the parts at the first or bobbin receiving station indicated generally at 32 in FIG. 1 will be described. A vertically extending tube 160 of a diameter somewhat larger than that of a full bobbin and defining an elevator shaft has a lower end received within an annular slot defined by an inner circular plate 161 and an outer ring 162 the ring, tube and plate being secured together as by screws 163. The plate 161 is secured to the base plate 27 by screws 164 (see FIG. 16). Tube 160 extends upwardly through an opening in lower shelf plate 43 (see FIG. 15). The tube is provided with a slot 165 (see FIGS. 8 and 16) extending vertically to shelf plate 43. An elevator indicated generally at 166 is mounted within the tube for raising and lowering movements therein. The elevator comprises a cup-shaped member 167 having a base 168 resting upon and secured to an arm 170 as by stud 171. Arm 170 (see FIGS. 8, 9 and 16) is formed integrally with or secured to a slider 172 the opposite ends of which are bored to receive vertically extending rods 173, the latter defining a track for the slider. The rods 173 are secured at their lower ends in a block 174 supported from the base 27 and at their upper ends in a block 175 secured to the underside of shelf plate 43 (see FIG. 4).

Elevator 166 in addition to the cup-shaped member 167 includes a side wall 176 secured to the cup member and having a series of spaced prongs projecting upwardly from a lower continuous annular portion 178 thereof. A pair of the prongs or fingers 177 project upwardly beyond the remaining prongs or fingers 180. Referring particularly to FIG. 16 it will be noted that tube 160 has an opening 181 opposite mouth 26, previously referred to, the opening 181, mouth 26 and chute 25 providing a passageway for delivery of bobbins to the elevator 166. The elongated prongs 177 are so positioned and are of such length that upon upward movement of the elevator with a bobbin therein they will prevent the upper end of the bobbin from jamming against the upper rim portion of opening 181. Alternate ones of the slots defining the prongs extend downwardly to a further extent than the intermediate slots for a purpose which will be apparent hereafter.

Elevator 166 is moved between its lowered and raised positions by an air cylinder mechanism shown particularly in FIGS. 9 and 27. This mechanism includes an air cylinder 183 mounted upon a structure 184 carried by the base plate 27. Slider 172 carries a bifurcated bracket 185 secured thereto as by screws 186. A cable 187 has one end connected to one arm of bracket 185 as by a fitting 188 the cable leading around a pulley 190 mounted for rotation on a structure 191 (FIG. 27), similar to structure 184, secured at the upper end of air cylinder 183. After passing around the pulley the cable extends through a suitably packed aperture (not shown) in the upper end cap of the air cylinder and is secured to one side of a piston (not shown). Similarly a cable 192 is secured to the other arm of bracket 188 and extends around pulley 193 rotatably mounted in structure 184, through a suitably packed aperture in the lower end cap of cylinder 183 and is connected to the opposite side of the piston therein. Means are provided for admitting air under pressure selectively to either end of the cylinder such means including air lines 194 and 195 connected to a suitable source of compressed air (not shown) through solenoid controlled valves 196 and 197 respectively (see FIG. 27).

Cup-shaped member 167 of elevator 166 is slotted to receive a trigger member 200 pivoted as at 201 and including a bobbin contact portion 202 (FIG. 16). The trigger member additionally includes a downwardly extending tail 203 adapted to contact an actuating arm 204 of a normally open limit switch 205 mounted from the base plate as by bracket 206 (see FIG. 9). Trigger member 200 is biased toward its position as illustrated in FIG. 16 with the contact portion thereof projecting into the cup by a garter spring 207 lying within an annular groove in the outer surface of the cup and a notch 210 in the trigger member. As will be understood, upon the dicharge of a bobbin into the elevator the lower end thereof will contact portion 202 and cause the rotation of member 200 in a counterclockwise direction as viewed in FIG. 16 to, in turn, close limit switch 205. A normally open limit switch 211, forming part of an electrical circuit (not shown) controlling the temporary opening of gate 28 of hopper 24, may also be mounted on the base plate the switch having an actuating arm 212 adapted to be depressed to close its switch when the elevator moves to its lowest position.

Referring particularly to FIG. 15 a ring 213 is secured around the upper end of tube 160, as by a plurality of set screws 214 one of which is shown. Ring 213 carries a plurality, three being preferred, of equally spaced fixed bobbin positioning elements 215, each of the elements having a base 216 secured to ring 213 as by a stud 217 and an upwardly and inwardly inclined bobbin positioning finger 220. Ring 213 also carries a plurality of movable positioning elements 221 alternating with the fixed elements 215. Each element 221 is mounted in a recess in ring 213 for pivotal movement on a pin 222. Each element 221 extends through a notch 227 in the upper end of the tube 160 and is biased toward the center of the tube by a compression spring 223 having one end received within a bore 224 in ring 213 and its other end impaled on a pin 225 projecting from element 221. The extent of such inward movement is limited by a tail 226 contacting a portion of ring 213. As will be understood when the elevator is in its raised position as illustrated in dot-and-dash lines in FIG. 15 elements 215 and 221 will extend through the slots, previously referred to, defining fingers 177 and 180, the slots of greater depth being opposite to and accommodating elements 221. A normally open limit switch 230, included in the electrical circuit hereafter described, is mounted on plate 29 adjacent ring 213 and has an actuating arm 231 positioned to be contacted by and moved to switch closing position by contact with one of the fingers 177 of the elevator as it approaches its raised position.

In the operation of elevator 166, upon its upward movement a bobbin thereon will be carried to the position illustrated in dot-and-dash lines in FIG. 15 the bobbin during such movement first contacting the inwardly biased positioning elements 221 whereby it is brought into substantially erect position, the bobbin on further raising movement, and with the cooperation of the fixed positioning elements, being brought into a fully erect position in alignment with the bobbin grasping member 74 carried by the overlying turret arm 36.

Referring now to FIGS. 1 and 17 to 21 inclusive the construction and operation of the mechanisms at the second or yarn end freeing station 33 will be described. A ring 232, in axial alignment with the bobbin grasping member 74 of the turret arm positioned at the second station, is supported on an annular ledge 233 surrounding a circular opening in shelf plate 43. Ring 232 has an upwardly projecting inset flange 234 defining a seat for an upwardly extending collar 235 secured to the flange by any suitable means. Ring 232 additionally includes preferably integral radially extending spokes 236 joined centrally to a hub 237 (FIGS. 18 and 20). As will be noted spokes 236 are semicircular in cross section with their flat sides downwardly and define yarn cutting edges 240. Cooperating with the spokes is a rotatable cutter device 239 comprising a hub 241 mounted for rotation on but below hub 237 as by pintle pin 242. Radiating outwardly from hub 241 are spokes 243 supporting a rim 244. Spokes 243 support cutter blades 245 (see particularly FIG. 20) the cutter blades extending angularly upwardly toward the flat lower surfaces of spokes 236. As will be noted portions of the blades also underlie the rim of the ring 232 and an annular portion of hub 237 (FIG. 17). The cutter blades 245 are supported, and resiliently urged against the ring, by compression springs 250 carried by headed studs 246 penetrating a flange 247 of the cutter blades and threaded into spokes 243. In order to oppose a tendency of the blades to rotate on their pins 246 in a counterclockwise direction as viewed in FIG. 20 set screw 251 is suitably employed in each spoke 243 the end of the set screw bearing against the outer margin of flange 247 of the associated blade. The outer annular surface of rim 244 is grooved to receive a belt 252 driven by the driving pulley 253 of an electric motor 254 supported on plate 29. Rim 244 also includes a downwardly projecting inset annular flange 258 received within the end of a duct 259 supported in fixed position from the frame member by any suitable means. Sufficient clearance is provided between flange 258 and the wall of the duct to permit the former to rotate relatively to the latter without interference.

A post 256 has a lower end of reduced diameter projecting through an opening in shelf plate 43 the post being secured by a nut 257 threaded on the projecting end below the shelf plate. Referring particularly to FIGS. 10 and 17 an air ring 260 concentric with collar 235 and ring 232 carries an outwardly projecting bracket 261 having a collar portion 262 fitting around the post and secured in position thereon as by set screw 263. An air line 264 leading from a suitable source of compressed air through a solenoid valve 268 (FIG. 27) is connected to an elbow fitting 265. Fitting 265 is threadably received in a socket in bracket 261 the socket being in communication with an air passageway (now shown) leading to the hollow interior 266 of the air ring. As illustrated particularly in FIG. 21 air ring 260 has an annular series of nozzles 267 in communication with the hollow interior of the ring and positioned to direct converging jets of air downwardly and inwardly of collar 235.

The operation of the above described mechanisms at the second station will now be explained. The turret is lowered and a bobbin, carried by the overlying turret arm, is positioned as illustrated in dot-and-dash lines in FIG. 17, valve 268 is opened to supply compressed air to air ring 260 and motor 254 is energized under the control of the control system herinafter to be described. As will be noted the base of the bobbin rests upon the hub 237 the latter serving as a bobbin positioning means. The converging jets of air issuing from nozzles 267 form an air blast which forces the tailing winding, as well as any starting end which may be entangled with the tailing winding, downwardly between the cutting edges defined by spokes 236 and cutter blades 245 whereby said ends are severed leaving a relatively short free end extending from the main body of yarn on the bobbin. The cut off ends are carried in the air stream set up in duct 259 to a collection chamber 269 (see FIG. 4).

Reference will now be made particularly to FIGS. 1, 3, 10 and 22 to 26 in the following description of the construction and operation of the mechanisms at the third station. A sleeve 270 having an annular flange 271 is secured as by studs 272 to the underside of shelf plate 45 adjacent but outwardly of a turret arm 36 overlying the third station. Sleeve 270 forms a bearing for a shaft 273 the lower end of which has secured thereto, as by set screw 274, a driving roller 275 in the form of a truncated cone. The roller is of a diameter and configuration to, when the turret arm is in its raised position, be in driving engagement with the annular surface of a bobbin grasping means 74. Shaft 273 penetrates an opening in shelf plate 45 and is secured by set screw 276 to the hub 277 of a gear 280. A collar 281 secured to shaft 273 as by set screw 282 serves to prevent upward movement of the shaft. A motor 283 (see FIG. 3) is mounted on shelf plate 45 and has a driving gear (not shown) in mesh with gear 280.

A suction nozzle 284 is connected through suitable fittings including elbows 285, 286 and 287 and a nipple 290 to a suction line 291 (see FIG. 2) which leads to a suction source comprising a blower 288 driven by a motor 289 (see FIG. 27). Suction nozzle 284 is positioned and dimensioned to have its mouth 292 extending opposite approximately the upper third of the windings on a bobbin supported by the turret arm at the third station when the turret arm is in its raised position. A bracket or sheft 293 secured to nipple 290 in any suitable way supports a cutter mechanism indicated generally at 294 and comprising scissor blades 295 and 296, located directly below the narrow mouth of the suction nozzle, mounted for oscillating movements on a pin or stud 297 threaded into an aperture in shelf 293. A spacer washer 300 is positioned on the pin between the blades and shelf 293 and the blades are urged into cooperating relationship with blade 296 against washer 300 by a compression spring 301 inserted between the head of the pin and the lower blade 295. Blade 295 includes an integral arm 302 pivotally connected as at 303 to one arm 304 of a yoke 305. Blade 296 similarly has an arm 306 pivotally connected at 307 to a second arm 310 of yoke 305. Yoke 305 is secured to the outer end of a piston rod 311 of an air cylinder device 312 the latter being of a character to advance rod 311 upon the admission of compressed air to the cylinder through line 313 and to retract the rod when the supply of the compressed air is cut off. The compressed air supply is under the control of a solenoid valve 314 (FIG. 27). As will be understood upon advance of the piston rod and hence of yoke 305 scissor blades 295 and 296 are rotated toward each other to perform a cutting or scissoring operation.

An air ring 315 carries a bracket 316 having a hub portion 317 mounted on a post 320 and secured thereto as by a set screw 321 (FIG. 25). Post 320 includes a threaded lower end of reduced diameter penetrating an opening in shelf plate 43 the post being secured in position by a nut 322. Air ring 315 is positioned to be a horizontal plane opposite to and to surround the base of a bobbin carried by the overlying arm 36 of the turret when the turret is in its raised position. An annular plate 323 forming the upper wall of the air ring has a continuous series of nozzle openings 324. The hollow interior of the air ring is connected to an air line 325 by a fitting 326 secured in a socket in the outer wall of bracket 316 the socket being in communication with a passageway (not shown) leading to the hollow interior of the air ring. Admission of air under pressure to the air ring is controlled by a solenoid operated valve 327 in air line 325 (FIG. 27).

A bobbin chute 330 leading to the loading position 17 (FIG. 1) of the winder magazine is supported in a cutaway portion of shelf plate 43 with its mouth underlying a bobbin held by the overlying turret arm 36. Chute 330 is slotted as indicated at 331 the slot extending for the full length thereof and having flaring entrance portion 332 adjacent the upper end of the chute. Suction tube 19 forming the yarn end holding means of the winder is extended as previously mentioned to terminate in a mouth 21 adjacent the upper end of chute 330 and opposite to slot 331 as illustrated particularly in FIG. 22.

In the operation of the mechanisms at the third station a bobbin held by the turret arm with the turret in its elevated position is rotated in a yarn unwinding direction by a drive roller 275. At the same time air under pressure is admitted to air ring 315 by the opening of valve 327 and motor 289 is energized to operate blower 288 and create suction in nozzle 284, such actions taking place at the proper time under the direction of the control system hereinafter described. As a result the yarn end, which has been freed at the second station, is blown upwardly by the annular blast of air issuing from air ring 315 and is caught by the air stream entering suction nozzle 284 and, as the bobbin continues to rotate, a substantial length of the yarn is drawn into the nozzle. The rotation of the roller and the air supply to ring 315 are then cut off. Thereafter and subject to a signal from the control system the turret is lowered to position the bobbin as illustrated in dot-and-dash lines in FIG. 22 and at the same time the bobbin grasping means 74 is deflated to release the bobbin whereby it drops by gravity down chute 330 to a loading position 17 of the winder magazine. During such movement yarn is drawn from the bobbin and enters slot 331 the yarn then extending from nozzle 284 in front of suction nozzle 21 and between the open scissor blades of cutter 294. At this time compressed air is admitted to cylinder 312 to actuate scissor blade 295 and 296 to sever the yarn between nozzle 284 and the bobbin whereby the end leading from the bobbin is carried into suction tube 19 the yarn traversing slot 22 until the bobbin reaches its final position in the winder magazine the yarn end then extending through semicircular slot 23. The cut off end is conveyed in the airstream set up through nozzle 284 to a waste collecting means (not shown).

Referring now to FIG. 27 the several operating mechanisms previously described in detail are shown diagrammatically in conjunction with an electrical control system whereby the mechanisms are caused to perform their functions at the required times to produce the desired sequence of operations. The electrical system, in addition to the elements previously mentioned, includes control relays 335, 336 and 337 and time delay relays 340 and 341. The time delay relays are of a conventional type which can be set to delay the energization of their windings or coils for selected periods. In referring to the movable contactors of the relays they will be called "normally closed" when they close, and "normally open" when they open a circuit between their fixed contacts upon de-energization of the relay coil.

One terminal of the coil of relay 335 is connected by a lead 342 to a main power lead 343. The other terminal of the coil is connected to a second main power lead 346 through lead 344, limit switch 230 and lead 235. Relay 335 has a normally closed contactor 347 adapted to close a circuit between a contact connected by a lead 350 to the main power lead 346 and a contact connected by a lead 351 to a first contact associated with a normally open contactor 352 of relay 337. Relay 335 also includes a normally open contactor 353 adapted to close a circuit between a contact connected by lead 350 to main power lead 346 and a contact connected by lead 354 to one terminal of the coil of solenoid valve 66 which controls the admission of air under pressure to the bobbin holders 74. The other terminal of the coil of valve 66 is connected by lead 355 to main power lead 343.

Turning now to relay 336 one terminal of its coil is connected by lead 356 to main power lead 343. The other terminal is connected by lead 357 to one terminal of limit switch 18, the switch being located beneath the loading position 17 of the winder magazine as previously pointed out. The other terminal of limit switch 18 is connected by a lead 361 to main power lead 346. A normally closed contactor 362 of relay 336 is adapted to close a circuit between a contact connected by lead 363 with one terminal of motor 289, which drives the blower for suction nozzle 284 at the third station, and a contact connected by lead 364 to a contact associated with a normally open contactor 365 of relay 337. A second normally closed contactor 366 of relay 336 is adapted to close a circuit between a contact connected by a lead 367 with one terminal of solenoid valve 59, controlling the lowering of the turret, and a contact connected by a lead 371 with a first contact of a normally open contactor 372 of relay 337. The second terminal of the solenoid valve 59 is connected by lead 370 to main power lead 343.

Reference is now made to relay 337 one terminal of the coil of which is connected by a lead 373 to main power lead 343. The second terminal of the coil is connected through a lead 374, limit switch 205, the actuating arm of which is adapted to be moved into switch closing position by trigger member 200 when a bobbin is deposited in elevator 166 as previously mentioned, and lead 375 to main power lead 346. The second terminal of the coil of relay 337 is also connected by a lead 376 to a contact associated with contactor 352. As previously pointed out the other contact associated with contactor 352 is connected by lead 351 to a contact associated with contactor 347 of relay 335. A second contact associated with contactor 372 is connected by a lead 377 with a contact associated with a normally open contactor 380 of time delay relay 340. Similarly a second contact associated with contactor 365 of relay 337 is connected by a lead 381 with a contact associated with a normally open contactor 382 of relay 340.

Referring further to the time delay relay 340 one terminal of its coil is connected by a lead 383 to main power lead 343 and the other terminal is connected through lead 384, normally closed limit switch 155, and lead 385 with main power lead 346. Normally open contactor 380 previously referred to is adapted to close a circuit between the contact forming a terminal of lead 377 and a contact connected by lead 386 with lead 384. Normally open contactor 382, previously referred to, is adapted to close a circuit between the contact forming a terminal of lead 381 and a contact connected through lead 387 with main power lead 346. A normally closed contactor 390 of time delay relay 340 is adapted to close a circuit between a contact connected by lead 391 to the same terminal of motor 389 as that to which lead 363 is connected and a contact connected by lead 392 through lead 387 to main power lead 346. A second normally closed contactor 393 of time delay relay 340 is adapted to close the circuit between a contact connected by lead 394 to one terminal of motor 283 which operates the driving roll 275. The other terminal of the motor is connected by lead 395 to main power lead 343. As will be noted solenoid valve 327 controlling the admission of air under pressure to air ring 315 at the third station is connected in parallel with motor 283 through leads 396 and 397.

Referring now to time delay relay 341 one terminal of the coil thereof is connected by a lead 398 to main power lead 343. The other terminal of the coil is connected through a lead 400 with the same terminal of switch 230 as that to which the lead 344 is connected. Relay 341 has a normally open contactor 401 adapted to close a circuit between a contact connected by lead 402 to main power lead 346 and a contact connected by a lead 403 with one terminal of solenoid valve 58 which controls the upward movement of turret 35. The other terminal of solenoid valve 58 is connected by a lead 404 and lead 370, previously mentioned, to main power lead 343. The second mentioned contact associated with contactor 401 is also connected by a lead 405 to one terminal of solenoid valve 197 which controls the downward movement of elevator 166. The other terminal of valve 197 is connected by a lead 406 to main power lead 343.

Solenoid valve 196 controlling the upward movement of elevator 166 has one terminal thereof connected by a lead 407 to lead 406 and its other terminal connected by a lead 410 to contact 69 of limit switch 70. The contactor of switch 70 is shifted to close against contact 69 by block 47 as the turret reaches its lowered position, and to close against contact 68 as by spring pressure, when the block is raised. The contact 68 of switch 70 is connected by a lead 411 to the same terminal of solenoid valve 66 as that to which lead 354 from relay 335 is connected. The movable contactor of limit switch 70 is connected by leads 412 and 413 to main power lead 346. The fixed contact of limit switch 67, which is also operated by block 47 upon vertical movement of the turret, is connected by a lead 414 and lead 413 to main power lead 346. The movable contactor of switch 67 is connected by a lead 415 to one terminal of motor 254 adapted to rotate cutter device 239 at the second station, the other terminal of the motor being connected by a lead 416 to main power lead 343. The solenoid valve 268 controlling the flow of compressed air to air ring 260 is connected in parallel with motor 254 by leads 417 and 420.

Referring again to normally open limit switch 18 below position 17 of the winder magazine, the fixed terminal thereof connected to the coil of relay 336 by lead 357 is also connected by lead 421 to one terminal of solenoid valve 314 which controls the operation of cutter device 294. The other terminal of valve 413 is connected to main power lead 343 by a lead 422. As previously explained one terminal of motor 289, operating blower 288 for suction nozzle 284, is connected by lead 363 to a contact associated with contactor 362 of relay 336. The other terminal of the motor is connected by a lead 423 with main power lead 343.

It will be understood that while the devices designated by reference characters 196 and 197 controlling the raising and lowering of the elevator have been described as solenoid valves the two devices are more accurately parts of a single valve unit of conventional type having two solenoids each, when energized, opening the valve in the air line to one end of cylinder 183 and closing the air line to the other end. Such valves, when both solenoids are de-energized will remain in their last adjusted condition. The solenoid valve unit controlling the raising and lowering movements of the turret and designated by reference characters 58 and 59 is of the same type. On the other hand solenoid valve 66 controlling the admission of compressed air to the interior of hollow rod 40, valve 268 controlling the admission of air to air ring 260, valve 327 controlling admission of air to air ring 315, and valve 314 controlling the admission of air to cylinder 312 for operating cutter mechanism 294, all also of a conventional type, are opened upon energization of their coils but closed as by spring action upon de-energization.

The operation of the unit incorporating the several bobbin readying mechanisms under the control of the electrical circuitry described above will now be pointed out in detail. A starting condition will be presumed in which turret 35 is in its raised position; at the first station elevator 166, containing a bobbin, is in its lowered position; at the second station a bobbin with its yarn end freed is held by the bobbin holder of the overlying turret arm; at the third station a bobbin with its yarn end found and extending loosely into inactive suction nozzle 284 is held by bobbin holder 74; and a bobbin is in the magazine of the winder at position 17. Under these conditions switch 205 adjacent the base of the elevator is closed whereby the coil of relay 337 is energized. Also the bobbin in the winder magazine at position 17 maintains switch 18 closed whereby the coil of relay 336 is energized. The coil of time delay relay 340 is also energized as limit switch 155 is closed. However the coils of control relay 335 and of time delay relay 341 are de-energized due to open limit switch 230. In addition, inasmuch as the turret is in its raised position limit switch 67 is open and limit switch 70 is closed to close the circuit to solenoid valve 66 and hence maintain the valve open.

In consequence of the above turret 35 will remain in its elevated position, as solenoid valve 59 is de-energized, and air under pressure will be supplied to maintain the bobbin holders inflated whereby they will continue their grasp on the bobbins at the second and third stations. At the first station the elevator will remain in its lowered position as solenoid valve 196 is closed. Motor 254 driving the cutter device at the second station is de-energized and solenoid valve 268 controlling the flow of air to the air ring 260 is closed, due to open limit switch 67. At the third station motor 283, controlling the rotation of driving roller 275, is de-energized and the solenoid valve controlling the flow of air to ring 315 is closed, due to open contactor 393 of relay 340. Motor 289 adapted to drive the blower for suction nozzle 284 is also de-energized as contactor 390 of relay 340 is open.

It will now be assumed that a replenishment bobbin is required by the winder unit. Upon delivery of the bobbin to the bobbin holder of the winder the control system of the winder, such system forming no part of the instant invention and hence not described, causes the magazine to index one step thereby removing the bobbin from position 17 and permitting switch 18 to open. The opening of switch 18 de-energizes the coil of relay 336 permitting contactors 362 and 366 to close and hence close the circuits controlled thereby. Thus the circuit to motor 289 is closed whereby blower 288 is driven to create a suction in nozzle 284 to firmly hold the yarn end of the bobbin at that station. The closing of the contactor 366 of relay 336 closes the circuit to solenoid valve 59 thereby opening the valve and admitting air under pressure to the upper end of air cylinder 52 with consequent downward movement of turret 35. As the turret descends limit switch 67 is permitted to close closing the circuit to motor 254, driving the cutter device 239, and the circuit to solenoid valve 268 thereby opening the valve and admitting air to air ring 260. As the turret continues to descend and approaches its lowest position block 47 contacts the actuating arm of limit switch 70 to open the circuit to solenoid valve 66 and shut off the flow of air to the bobbin holders 74 whereby the latter are deflated. As will be noted the connection of the same terminal of the solenoid valve to main power lead 346 has been open due to the de-energization of the coil of relay 335. As a consequence of the deflation of the holders 74 the bobbin at the third station is released and slides down the chute 330 into the empty bobbin pocket at position 17 of the magazine. The bobbin upon arriving in the pocket again closes the limit switch 18 whereby the coil of relay 336 is again energized and opened to open the circuit to motor 289 driving blower 288 and to open the circuit of solenoid valve 59. The closing of limit switch 18 also simultaneously closes the circuit to solenoid valve 314 whereby air under pressure is admitted to cylinder 312 causing actuation of cutter 294 to sever the yarn which has been drawn from the bobbin and which now extends between suction nozzle 284 and the bobbin in its position in the magazine. It will be appreciated that cutting off the flow of air to the bobbin holders 74 also released the bobbin at the second station but inasmuch as its base, due to the previous lowering of the turret, is now resting on the hub 237 of ring 232 the upper end of the bobbin will retain its position within the bobbin holder.

The lowering of the turret and the consequent contact of block 47 with the actuating arm of limit switch 70, in addition to de-energizing solenoid valve 66, closes the circuit to solenoid valve 196 opening the valve whereby air is admitted to cyclinder 183 to drive the elevator 166 upwardly carrying a bobbin therewith to bring the upper end of the bobbin into holder 74 carried by the turret arm overlying the first station. It will be noted that the opening of valve 196 also supplies air to line 158 to cause the retraction of the turret indexing pawl. Upon upward movement of the elevator switch 205 opens thereby opening the circuit through leads 374 and 375 to the coil of relay 337. However the relay remains energized due to the holding circuit defined by lead 376, closed contactor 352 of relay 337, lead 351, closed contactor 347 of de-energized relay 335 and lead 350. As the elevator approaches its raised position it strikes the actuating arm 231 of limit switch 230 thereby closing the circuit to the coil time delay relay 341. However the energization of the relay is delayed by the predetermined setting thereof. Closing of the limit switch 230 also closes the circuit to the coil of relay 335 energizing the same to open normally closed contactor 347, whereby the coil of relay 337 is de-energized, and to close normally open contactor 353. The closing of contactor 353 closes the circuit through leads 350 and 354 to solenoid valve 66 whereby the latter opens to again supply air under pressure to the bobbin holders 74 to grasp the bobbin in the elevator and the bobbin resting on the hub of the cutter device at the first and second station respectively.

As previously mentioned relay 341 was set to delay the energization of its coil permitting elevator 166 to complete its upward movement to position the upper end of the bobbin therein with the holder 74 of the overlying turret arm. Upon exhaustion of the time delay and consequent energization of the relay contactor 401 closes against its associated contacts to close the circuit to solenoid valve 58 whereby air under pressure is admitted through line 56 to cylinder 52 to cause upward movement of turret 35, and solenoid valve 197 is energized to admit air under pressure through line 195 to cylinder 183 to cause the elevator to descend. As will be noted air line 156, which supplies air under pressure to air cylinder 127 for the turret indexing stroke of pawl 134, is a continuation of air line 195. Also air line 158 which supplies air under pressure to the cylinder to reset the pawl is a continuation of air line 194. In order, upon the opening of valve 197, to delay the indexing of the turret until it has reached its elevated position a flow control valve 428 is provided in air line 158. The valve 428 is of a conventional pressure type which will maintain a back pressure in cylinder 127 sufficient to prevent the turret indexing movement of the pawl until full line pressure is present in line 195 due to the completion of travel of the piston in air cylinder 183, the turret by this time having reached its elevated position. When full line pressure is applied to the piston in cylinder 127 the turret is indexed to carry the bobbin at the first station to the second station and the bobbin at the second station, which in the meantime has had its yarn end freed, to the third station. As previously mentioned upon substantial completion of the indexing movement of pawl 134 hub 132 strikes the actuating arm 157 of limit switch 155 to open the switch. This opens the circuit to the coil of time delay relay 340. As a result normally closed contactor 390 closes the circuit to motor 289 to again activate nozzle 284. Also contactor 393 closes thereby energizing motor 283 to drive roller 275, and energizing solenoid valve 327 to permit the flow of air to air ring 315. Upon the retracting movement of the pawl 134, after the completion of its indexing stroke, limit switch 155 will again close but the energization of relay 340 will be delayed due to the time delay setting thereof which is such as to permit the operation of the motor 283, air ring 315 and suction nozzle 284 for a sufficient period, say two or four seconds, to enable the previously freed yarn end of the bobbin to be caught in the suction stream and a substantial length unwound from the bobbin and carried into the nozzle 284. Upon completion of the time delay period the coil of the relay is again energized and the activity at the third station terminates. When a bobbin is delivered to the elevator from the hopper 24 the bobbin readying unit is restored to its starting condition. The delivery of the bobbin may, if desired, be automatically effected as for example by the descent of the elevator to its low position thereby closing limit switch 211 previously referred to (see FIGS. 8 and 9) and energizing suitable mechanism (not shown) which opens hopper gate 28 to permit the passage of one bobbin down chute 25.

Having thus described the invention in rather complete detail it will be understood that these details need not be strictly adhered to, and that various changes and modifications may be made all falling within the scope of the invention as defined by the following claims.

We claim:

1. In an apparatus for preparing full bobbins as they are received from a spinning machine, said bobbins normally having tailing windings on one end thereof, for rewinding of the yarn thereon into packages on a winder including a magazine to receive the full bobbins and means to hold freed yarn ends of the bobbins, the improvement comprising a first station for receiving a series of full bobbins from a supply thereof, a second station including means to free a yarn end of said bobbin, and a third station having means to find and hold said free yarn end, and means for positively grasping each bobbin received at the first station by one end thereof and positioning it successively at said second and third stations and thereafter releasing it.

2. In an apparatus as defined in claim 1 wherein said means to free a yarn end comprises means for applying an annular blast of air from a location intermediate the bobbin ends and surrounding the bobbin toward the end of said bobbin normally carrying said tailing windings and means adjacent and opposite said bobbin end for severing yarn carried in said airstream, said last named means comprising cutter blades radially extending from a rotatable hub, said hub being in substantially axial alignment with said bobbin and there is means for rotating said hub.

3. In an apparatus as defined in claim 2 wherein there are fixed blades cooperating with the blades carried by said hub.

4. In an apparatus as defined in claim 1 wherein said means for finding and holding said yarn end at said third station comprises a suction nozzle having a mouth adjacent a bobbin held at said third station and additionally comprises means for applying an annular blast of air around said bobbin and in an axial direction thereof toward said suction nozzle, and there is means for rotating said bobbin.

5. In an apparatus as defined in claim 1 wherein said means for grasping and positioning said bobbins comprises an indexible turret having arms each carrying a bobbin holding means and there is means to index said turret to successively position each bobbin holding means at each of said stations.

6. In an apparatus as defined in claim 1 wherein said first station comprises an elevator adapted in a lowered position thereof to receive a bobbin and there is means to raise said elevator to position the bobbin therein for grasping by said bobbin grasping and positioning means.

7. In an apparatus as defined in claim 1 wherein said means for grasping a bobbin comprises an inflatable element for association with a bobbin end and there is means for inflating and deflating said inflatable member.

8. In an apparatus as defined in claim 7 wherein said inflatable member is of cup shape and adapted to receive the end of the bobbin therein when said member is deflated and to grasp said bobbin end when said member is inflated.

9. In an apparatus as defined in claim 7 wherein said bobbin has an axial bore and said inflatable member is of a configuration to be received within said bore when it is deflated and to hold said bobbin by contact with the side walls of said bore when inflated.

References Cited

UNITED STATES PATENTS

| | | | |
|---|---|---|---|
| 3,031,149 | 4/1962 | Furst et al. | 242—35.6 |
| 3,059,866 | 10/1962 | Reiners. | |
| 3,224,694 | 12/1965 | Isao Oishi | 242—35.5 |
| 3,279,710 | 10/1966 | Raasch | 242—35.5 |
| 3,295,776 | 1/1967 | Cruickshank et al. | 242—35.6 |
| 3,329,362 | 7/1967 | Kieronski | 242—35.6 |
| 3,381,908 | 5/1968 | Iqushi et al. | 242—35.5 |
| 3,388,872 | 6/1968 | Rupper | 242—35.6 |
| 3,389,866 | 6/1968 | Mullers | 242—35.5 |

STANLEY N. GILREATH, Primary Examiner